United States Patent
Chang et al.

(10) Patent No.: US 8,922,504 B2
(45) Date of Patent: Dec. 30, 2014

(54) CLICK GESTURE DETERMINATION METHOD, TOUCH CONTROL CHIP, TOUCH CONTROL SYSTEM AND COMPUTER SYSTEM

(75) Inventors: Chun-Chieh Chang, Hsinchu (TW); Chih-Chang Lai, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 743 days.

(21) Appl. No.: 13/092,980

(22) Filed: Apr. 25, 2011

(65) Prior Publication Data
US 2012/0162100 A1    Jun. 28, 2012

(30) Foreign Application Priority Data
Dec. 27, 2010    (TW) ............................... 99146073 A

(51) Int. Cl.
*G06F 3/041* (2006.01)
*G06F 3/0488* (2013.01)

(52) U.S. Cl.
CPC .......... *G06F 3/0416* (2013.01); *G06F 3/04883* (2013.01)
USPC ........................................................ 345/173

(58) Field of Classification Search
None
See application file for complete search history.

(56) References Cited

U.S. PATENT DOCUMENTS

| | | | | |
|---|---|---|---|---|
| 6,028,271 A | * | 2/2000 | Gillespie et al. | 178/18.01 |
| 7,254,775 B2 | * | 8/2007 | Geaghan et al. | 715/701 |
| 7,626,580 B2 | * | 12/2009 | Keely et al. | 345/179 |
| 7,982,717 B2 | * | 7/2011 | Chien et al. | 345/173 |
| 8,040,321 B2 | * | 10/2011 | Peng et al. | 345/169 |
| 2006/0007175 A1 | | 1/2006 | Shen | |
| 2009/0128516 A1 | * | 5/2009 | Rimon et al. | 345/174 |

FOREIGN PATENT DOCUMENTS

| | | |
|---|---|---|
| CN | 1673941 A | 9/2005 |
| CN | 1811684 A | 8/2006 |
| CN | 1912819 A | 2/2007 |
| TW | I248028 | 1/2006 |
| TW | 201015409 | 4/2010 |

* cited by examiner

*Primary Examiner* — Jason Olson
(74) *Attorney, Agent, or Firm* — Winston Hsu; Scott Margo

(57) ABSTRACT

Disclosed is a click gesture determination method for a touch control chip capable of simply and flexibly determining a single click gesture. The click gesture determination method includes steps of comparing one or more signal values of one or more detecting signals with one or more threshold values, to determine whether a touch event occurs, continuing the above comparing if a touch event occurs, to detect a continuous occurrence time of the touch event, and comparing the continuous occurrence time with a first predefined time, and determining that a single click gesture occurs for a result of the comparison that the continuous occurrence time is longer than the first predefined time.

22 Claims, 6 Drawing Sheets

CLICK GESTURE DETERMINATION METHOD, TOUCH CONTROL CHIP, TOUCH CONTROL SYSTEM AND COMPUTER SYSTEM

BACKGROUND OF THE INVENTION

1. Field of the Invention

The present invention relates to a click gesture determination method, and more particularly, to a click gesture determination method, a touch control chip, a touch control system and a computer system utilizing the touch control chip capable of simply and flexibly determining a single click gesture.

2. Description of the Prior Art

Generally, touch sensing devices such as capacitive, resistive and other types of touch sensing devices, are capable of generating detecting signals related to a user's touch event in a touch sensing chip; the chip then compares the signal values of the detecting signals with threshold values, and determines, according to a result of the comparison, a touch point, and in turn, a gesture. In an example of capacitive touch sensing devices, touch events are determined by detecting the capacitance difference generated when the human body touches a touch point on the touch panel; in other words, capacitive touch sensing can be realized through determining a touch point, and in turn, a touch event, by detecting the variations in capacitance characteristics when the human body touches the touch point.

Specifically, please refer to FIG. 1, which illustrates a conventional projected capacitive touch sensing device 10. The projected capacitive touch sensing device 10 includes sensing capacitor strings $X_1$-$X_m$, $Y_1$-$Y_n$. Each of the sensing capacitor strings $X_1$-$X_m$, $Y_1$-$Y_n$ is a one-dimensional structure formed by a plurality of sensing capacitors connected in series. Conventional touch sensing methods resort to detecting the capacitance of each of the sensing capacitor strings to determine whether a touch event occurs. The sensing capacitor strings $X_1$-$X_m$ and $Y_1$-$Y_n$ are utilized to determine vertical and horizontal touch events, respectively. In the case of horizontal operations, assume the sensing capacitor string $X_1$ has Q sensing capacitors each with a capacitance of C, then under normal circumstances, the sensing capacitor string $X_1$ has a capacitance of QC; and when the human body (e.g. a finger) comes in contact with a sensing capacitor of the sensing capacitor string $X_1$, assume the difference in capacitance is $\Delta C$. It follows that, if the capacitance of the sensing capacitor string $X_1$ is detected to be greater than or equal to a predefined value (e.g. QC+$\Delta C$), it can be inferred that a finger is touching a certain point on the sensing capacitor string $X_1$. Likewise, a determination may be similarly asserted for vertical operations. As illustrated in FIG. 1, when the finger touches a touch point TP1 (i.e. coordinates ($X_3$, $Y_3$)), the capacitances of the sensing capacitor strings $X_3$ and $Y_3$ are concurrently modified, and it may therefore be determined that the touch point falls at coordinates ($X_3$, $Y_3$). Note that, however, the threshold capacitances of the sensing capacitor strings $X_1$-$X_m$ for determining vertical directions, and the threshold capacitance of the sensing capacitor strings $Y_1$-$Y_n$ for determining horizontal directions, do not have to be the same, depending on practical requirements.

Conventionally, under the aforementioned configurations, determining a single click gesture requires concurrently satisfying both time and distance constraints for a single click gesture to be established. Specifically, please refer to FIG. 2, which illustrates a time constraint for a conventional single click gesture determination. In determining single click gestures, the time constraint requires that for a certain touch point, the time Td during which the touch occurs must be longer than a predefined time T1 and shorter than a predefined time T2, e.g. the time Td during which capacitance is greater than the threshold capacitance QC+$\Delta C$ must be longer than 150 ms and shorter than 500 ms. Constraining the time Td to be greater than the predefined time T1 precludes faulty determinations; and constraining the time Td to be shorter than the predefined time T2 means that a single click gesture must be performed within a predefined time T2. On the other hand, the distance constraint requires an entering point and a leaving point to have identical positions. The distance constraint represents that the movement of a single click gesture must be less than a certain distance. If both time and distance constraints are met, the determination for a single click gesture can be established.

However, conventional methods for determining a single click gesture impose both time and distance constraints, resulting in a determination process that is overcomplicated and inflexible for various application needs. Hence, an improvement over the prior art is necessary.

SUMMARY OF THE INVENTION

Thus, one primary objective of the disclosure is to provide a click gesture determination method, a touch control chip, a touch control system and a computer system utilizing the touch control chip capable of simply and flexibly determining a single click gesture, so as to meet various application needs.

In an embodiment, a click gesture determination method for a touch control chip is disclosed. The click gesture determination method includes comparing one or more signal values of one or more detecting signals with one or more threshold values, to determine whether a touch event occurs; if a touch event occurs, continue the aforementioned comparing, to detect a continuous occurrence time of the touch event; and compare the continuous occurrence time with a first predefined time, and when the continuous occurrence time is longer than the first predefined time, determine that a single click gesture occurs.

In another embodiment, a touch control chip for a touch control system is further disclosed. The touch control chip includes a detection unit, for comparing one or more signal values of one or more detecting signals with one or more threshold values, to determine whether a touch event occurs; if a touch event occurs, continue the aforementioned comparing, to detect a continuous occurrence time of the touch event; and a determining unit, for comparing the continuous occurrence time with a first predefined time, and if the continuous occurrence time is greater than the first predefined time, determine a single click gesture occurs.

Additionally, a touch control system is further disclosed in another embodiment, for determining a single click gesture. The touch control system includes a touch sensing device, for generating one or more signal values of one or more detecting signals; and the aforementioned touch control chip.

Additionally, a computer system is disclosed in yet another embodiment, including a host, and the aforementioned touch control system, for determining single click gestures.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
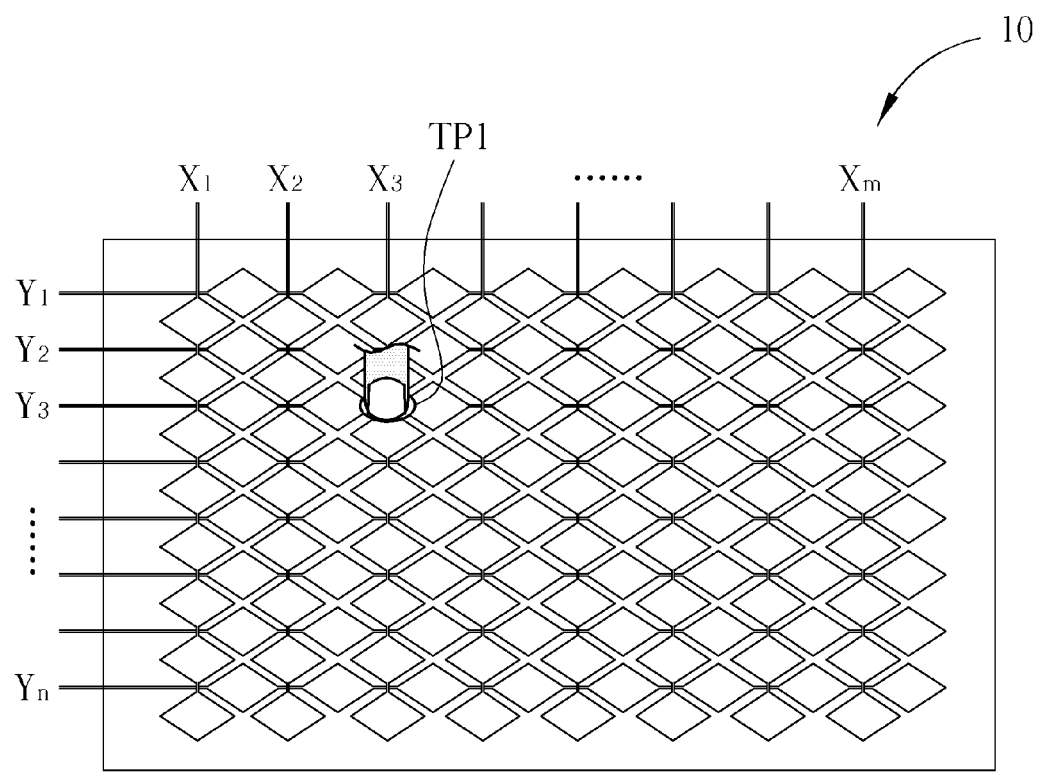
FIG. 1 is a schematic diagram of a conventional projected capacitive touch sensing device.
Figure 2:
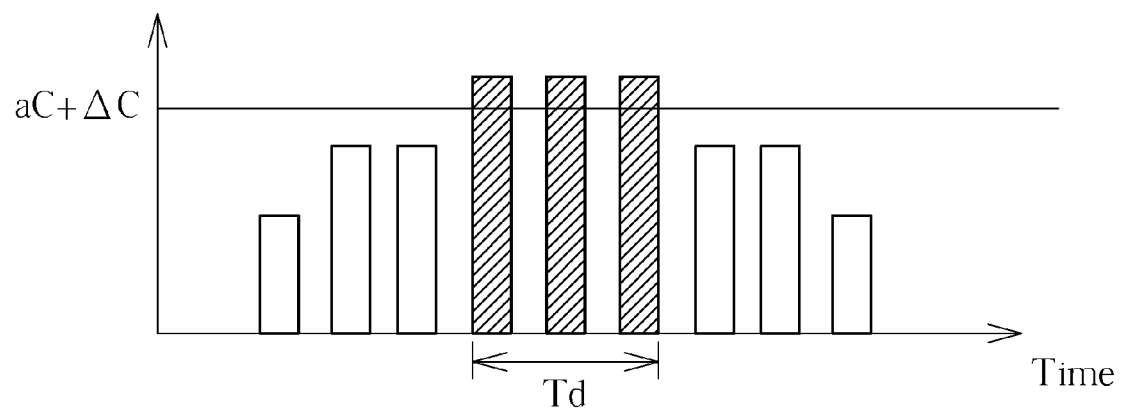
FIG. 2 is a schematic diagram of a time constraint for a conventional single click gesture determination.
Figure 3:
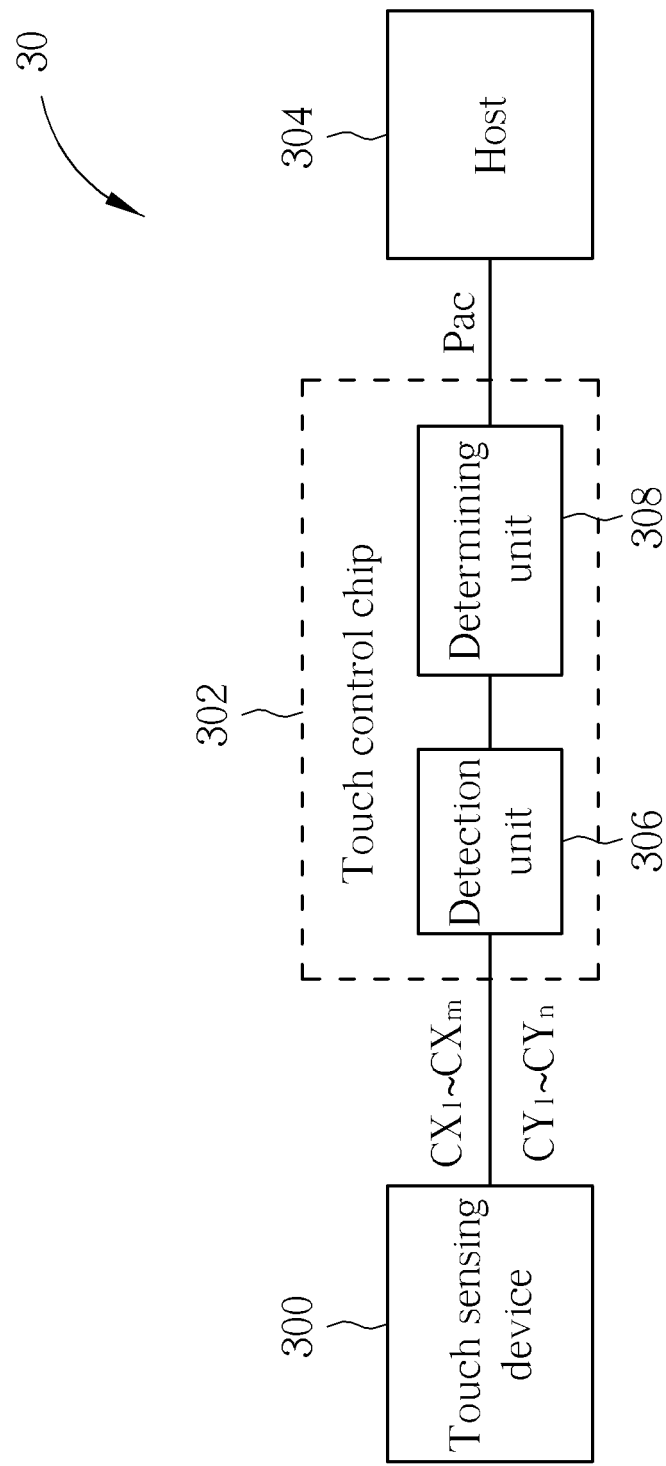
FIG. 3 is a functional block diagram of a computer system according to an embodiment.

Please refer to FIG. 3, which illustrates a functional block diagram of a computer system 30 according to an embodiment. As can be seen in FIG. 3, the computer system 30 mainly includes a touch sensing device 300, a touch control chip 302 and a host 304, wherein the touch sensing device 300 and the touch control chip 302 constitute a touch control system.

The touch sensing device 300 is capable of sensing an object to be detected (e.g. a finger, a pen . . . etc) and generating one or more detecting signals indicating a position of the object to be detected on a detecting panel (not shown). The touch control chip 302 includes a detection unit 306 and a determining unit 308. The detection unit 306 compares one or more signal values of one or more detecting signals with one or more threshold values, to determine whether a touch event TE occurs. Additionally, if a touch event occurs, the detection unit 306 continues the aforementioned comparing, to detect a continuous occurrence time Td' of the touch event TE. The determining unit 308 then compares the continuous occurrence time Td' with a first predefined time T1, and determines that a single click gesture occurs if the continuous occurrence time Td' is longer than the first predefined time T1 (for precluding faulty determinations). The determining unit 308 then sends the result of the determination as a determining signal to the host 304.

The following detailed description is based on a capacitive touch control system for illustrative purposes, but can also be generalized to resistive or other types of touch control systems, and is not limited to this. A capacitive touch sensing device 300 generates capacitance signals $CX_1$-$CX_m$, $CY_1$-$CY_n$ corresponding to sensing capacitor strings $X_1$-$X_m$, $Y_1$-$Y_n$ as detecting signals.

The detection unit 306 compares the capacitance signals $CX_1$-$CX_m$ and $CY_1$-$CY_n$ with a vertical threshold value Cvt and a horizontal threshold value Cht, respectively, to determine whether a touch event occurs. Additionally, the detection unit 306 continues the comparing after the touch event TE occurs, so as to detect a continuous occurrence time Td' of the touch event TE. More specifically, the detection unit 306 can determine that the touch event TE occurs at a corresponding entering point TI1 if a capacitance signal of the capacitance signals $CX_1$-$CX_m$ is greater than the vertical threshold value Cvt and a capacitance of the capacitance signals $CY_1$-$CY_n$ is greater than the horizontal threshold value Cht. Additionally, after the touch event TE occurs, the detection unit 306 can continue comparing the capacitance signals $CX_1$-$CX_m$, $CY_1$-$CY_n$ with the vertical threshold value Cvt and the horizontal threshold value Cht, respectively, so as to detect the continuous occurrence time Td' of the touch event TE, i.e. the time in which the touch continuously occurs on the touch sensing device 300. It is worth noting that the vertical threshold value Cvt and the horizontal threshold value Cht may or may not be the same, depending on practical requirements.

After the determining unit 308 detects the continuous occurrence time Td', the determining unit 308 in turn compares the continuous occurrence time Td' with a first predefined time T1, and determines that a single click gesture occurs if the continuous occurrence time Td' is longer than the first predefined time T1. Furthermore, the determining unit 308 determines a first leaving point TO1 of the single click gesture at the end of the continuous occurrence time Td', and generates a packet Pac indicating the single click gesture occurs at the first leaving point TO1; the packet Pac is then transmitted to the host 304, which can further operate according to the packet Pac. The process in the aforementioned operations relevant to the determination of a touch point is similar to that of the projected capacitive touch sensing device 10, and thus not discussed here in further detail.

As can be seen from the above, this embodiment is free from such distance constraints on a movement of a single click gesture, as are imposed by prior art techniques. In the touch event TE of a single click gesture according to this embodiment, the single click gesture occurs at the leaving point TO1, and the touch point TI1 and the leaving point TO1 are not necessarily to be set the same. As a result, compared to prior art techniques, this embodiment is capable of determining single click gestures more simply and more flexibly for use in various applications. In the following, FIGS. 4 and 5 are used to demonstrate the operations of different embodiments.

Figure 4:
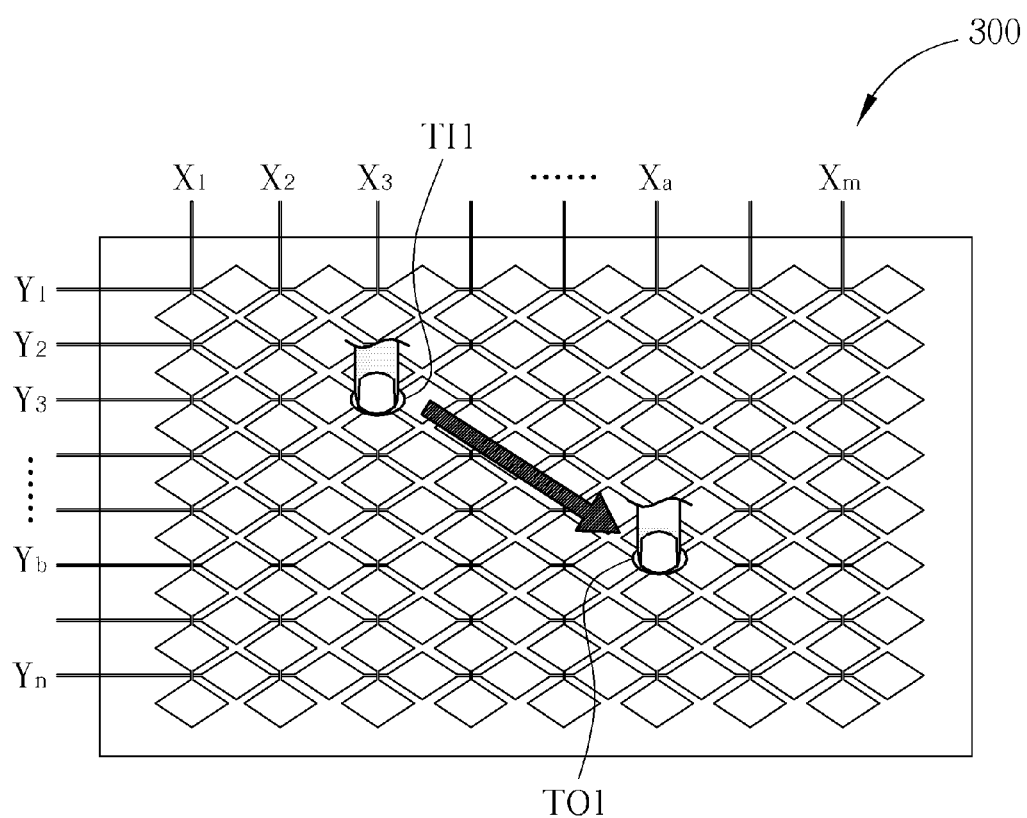
FIG. 4 is a schematic diagram of operations of a computer system according to an embodiment.
Figure 5:
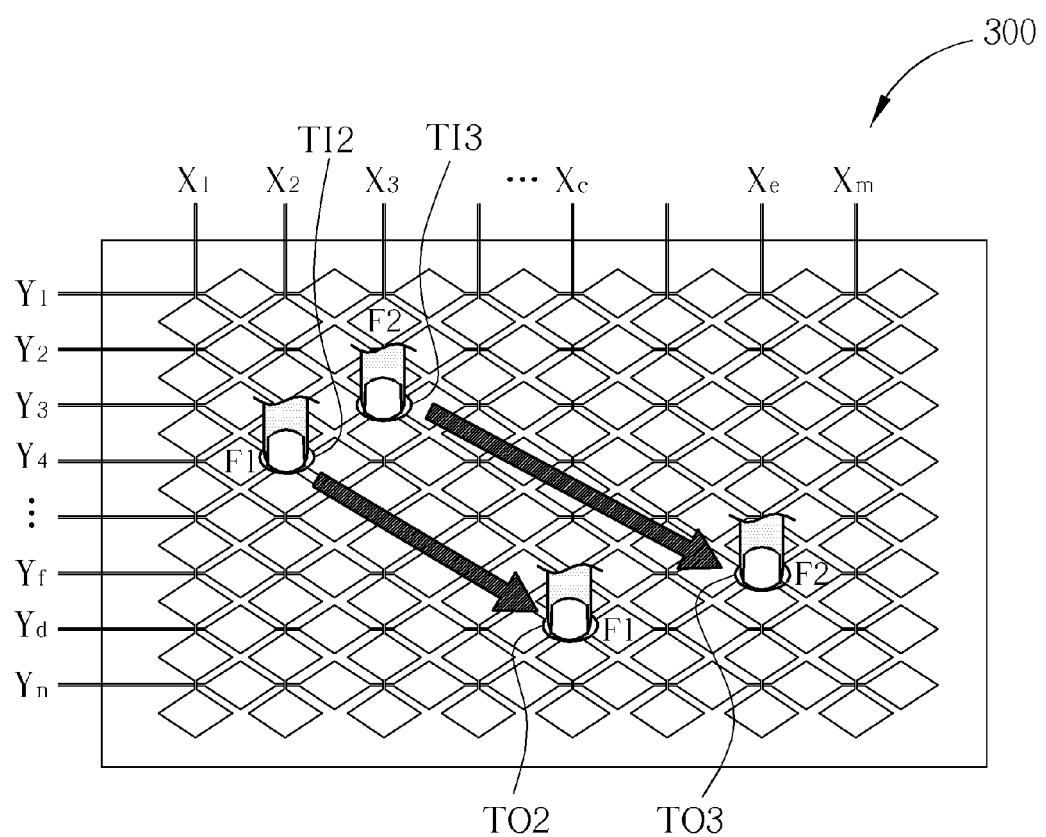
FIG. 5 is a schematic diagram of operations of a computer system according to another embodiment.

Please refer to FIG. 4, which illustrates operations of the computer system 30 of FIG. 3 according to an embodiment. In this example, the touch control chip 302 performs a self-capacitance scan on every region of the touch sensing device 300. The results of the scanning is fed to a microprocessor control unit (MCU) to be further processed into coordinates (X, Y). This process can take a time of, say, 10 ms. First, when a finger touches a point with coordinates ($X_3$, $Y_3$), if the detecting unit 306 detects that the values of the capacitance signals $CX_3$ and $CY_3$ are greater than a threshold capacitance Ct, it can determine the coordinates ($X_3$, $Y_3$) to be the entering point TI1, and increment a single click counter Click_Count by 1 to initiate a timekeeping process. Next, similar determination can be repeated, and the single click counter Click_Count can be incremented whenever the determination result is positive. Once the determination result is no longer sustained, i.e. when the finger moves to a point with coordinates ($X_a$, $Y_b$) and leaves the touch sensing device 300, the detection unit 306 can take the coordinates ($X_a$, $Y_b$) as the leaving point TO1, and a current value of the single click counter Click_Count as the continuous occurrence time Td'. Next, the determining unit 308 can determine whether the continuous occurrence time Td' is longer than the predefined time T1 (e.g. 150 ms); when the result is positive, it can determine a position at which a single click gesture occurs, preferably at the leaving point TO1 (with the coordinates ($X_a$, $Y_b$)). Note that, in other embodiments, a single click gesture can be determined to occur at other points, e.g. the entering point TI1.

It is worth noting that, while determining whether a single click gesture occurs, there can be an additional time constraint. For example, in FIGS. 3 and 4, in addition to constraining the continuous occurrence time Td' be longer than the predefined time T1, it can be further constrained that the concurrent continuous occurrence time Td' be shorter than a predefined time T2. If both constraints are satisfied, the determining unit 308 can determine the occurrence of a single click gesture at the leaving point TO1; otherwise the determining unit 308 determines that the single click gesture does not occur. Though the additional time constraint is imposed, the operation is still simpler and more flexible for various applications, because the movement of a single click gesture is not constrained within a specific distance, and the determining unit 308 can determine the occurrence of a single click gesture at the leaving point TO1.

Moreover, when determining the occurrence of a single click gesture, there can be an additional distance constraint. For example, in FIGS. 3 and 4, there can be an additional constraint requiring that the coordinates $(X_a, Y_b)$ of the leaving point TO1 and the coordinates $(X_3, Y_3)$ of the entering point TI1 be the same or approximate (within a specific distance from each other). Alternatively, the entering point TI1 and the leaving point TO1 can be constrained to be different (e.g. apart from each other by more than a specific distance).

Please refer to FIG. 5, which illustrates operations of the computer system 30 of FIG. 3 according to another embodiment. The main distinction between FIG. 5 and FIG. 4 is that FIG. 5 illustrates the scenario of two fingers concurrently touching the touch sensing device 300. As shown in FIG. 5, two fingers F1, F2 first touch points with coordinates $(X_2, Y_4)$ and $(X_3, Y_3)$, i.e. entering points TI2 and TI3, respectively, at a same or similar time point. Next, when the fingers F1, F2 move to points with coordinates $(X_c, Y_d)$ and $(X_e, Y_f)$, respectively, and leave the touch sensing device 300, the detection unit 306 takes the coordinates $(X_c, Y_d)$ and $(X_e, Y_f)$ as leaving points TO2, TO3, and determines a concurrent continuous occurrence time Td2 corresponding to the touch points of the fingers F1 and F2. This concurrent continuous occurrence time Td2 can be set as the time during which the fingers F1, F2 are concurrently positioned on the touch sensing device 300. Alternatively, the concurrent continuous occurrence time Td2 can also be set as the shortest time for either the finger F1 or the finger F2 to stay on the touch sensing device 300; or it can be set as the longest time for either the finger F1 or the finger F2 to stay on the touch sensing device 300. When this concurrent continuous occurrence time Td2 is longer than the predefined time T1, the determining unit 308 determines the occurrence of a single click gesture, and preferably determines the occurrence at the leaving points TO2 and TO3 (with coordinates $(X_c, Y_d)$ and $(X_e, Y_f)$). It is worth noting that, in other embodiments, it is possible to determine the occurrence at other points, e.g. the entering points TI2 and TI3.

Please note that in the embodiment of FIG. 5, there can be an additional time constraint. For example, there can be an additional constraint requiring the concurrent continuous occurrence time Td2 to be shorter than a predefined time T2. When this constraint is also satisfied, the determining unit 308 can determine the occurrence of a single click gesture at the leaving points TO2, TO3; otherwise the determining unit 308 can determine that the single click gesture does not occur. Alternatively, it can be constrained that the leaving points TO2, TO3 must occur at the same or different time points (the time points at which fingers F1 and F2 leave the touch sensing device 300). Although the extra time constraint is imposed, the operation is still simpler and more flexible for various applications, because the movement of a single click gesture is not constrained within a specific distance, and the determining unit 308 can determine the occurrence of a single click gesture at the leaving point TO1.

Moreover, in different embodiments, there can be additional distance constraints. For example, there can be an additional constraint requiring the leaving points TO2 and TO3 (with the coordinates $(X_c, Y_d)$ and $(X_e, Y_f)$) and the entering points TI2 and TI3 (with the coordinates $(X_2, Y_4)$ and $(X_3, Y_3)$) to have the same or similar coordinates (within a specific distance from each other), respectively, or conversely, require them to have different coordinates (apart from each other by more than a specific distance).

Furthermore, in other different embodiments, it is possible to employ different distance and time constraints. For example, by constraining the leaving points TO2, TO3 (with the coordinates $(X_c, Y_d)$, $(X_e, Y_f)$) and the entering points TI2, TI3 (with the coordinates $(X_2, Y_4)$, $(X_3, Y_3)$) to have the same coordinates, respectively, and also constraining the leaving points TO2, TO3 to have the same occurrence times, it means that the fingers F1, F2 concurrently single click the touch sensing device 300 at the leaving points TO2, TO3, then leave the touch sensing device 300. Alternatively, if the leaving point TO2 (with the coordinates $(X_c, Y_d)$) and the entering point TI2 (with coordinates $(X_2, Y_4)$) have different coordinates, and the leaving point TO2 occurs before the leaving point TO3, it means that the fingers F1, F2 first drag on the touch sensing device 300, then the finger F1 leaves, followed by the finger F2; the determining unit 308 determines the occurrences of the single click gestures at the leaving points TO2, TO3, when the finger F1 and the finger F2 leave, respectively.

Furthermore, the number of operating fingers in FIG. 5 is not limited, so long as the occurrence of a single click gesture is determined when the continuous occurrence time is longer than the predefined time T1 (e.g. determined at the leaving point). Accordingly, this embodiment provides more flexibility in different applications. For example, during operation of playing a guitar, it is possible for a plurality of fingers to concurrently operate on the touch sensing device 300, and the occurrences of single click gestures are determined at the respective leaving points as each finger leaves the touch sensing device 300. Those skilled in the art may make alterations and modifications accordingly, without any limitations to the aforementioned operations illustrated in FIG. 4 and FIG. 5.

Figure 6:
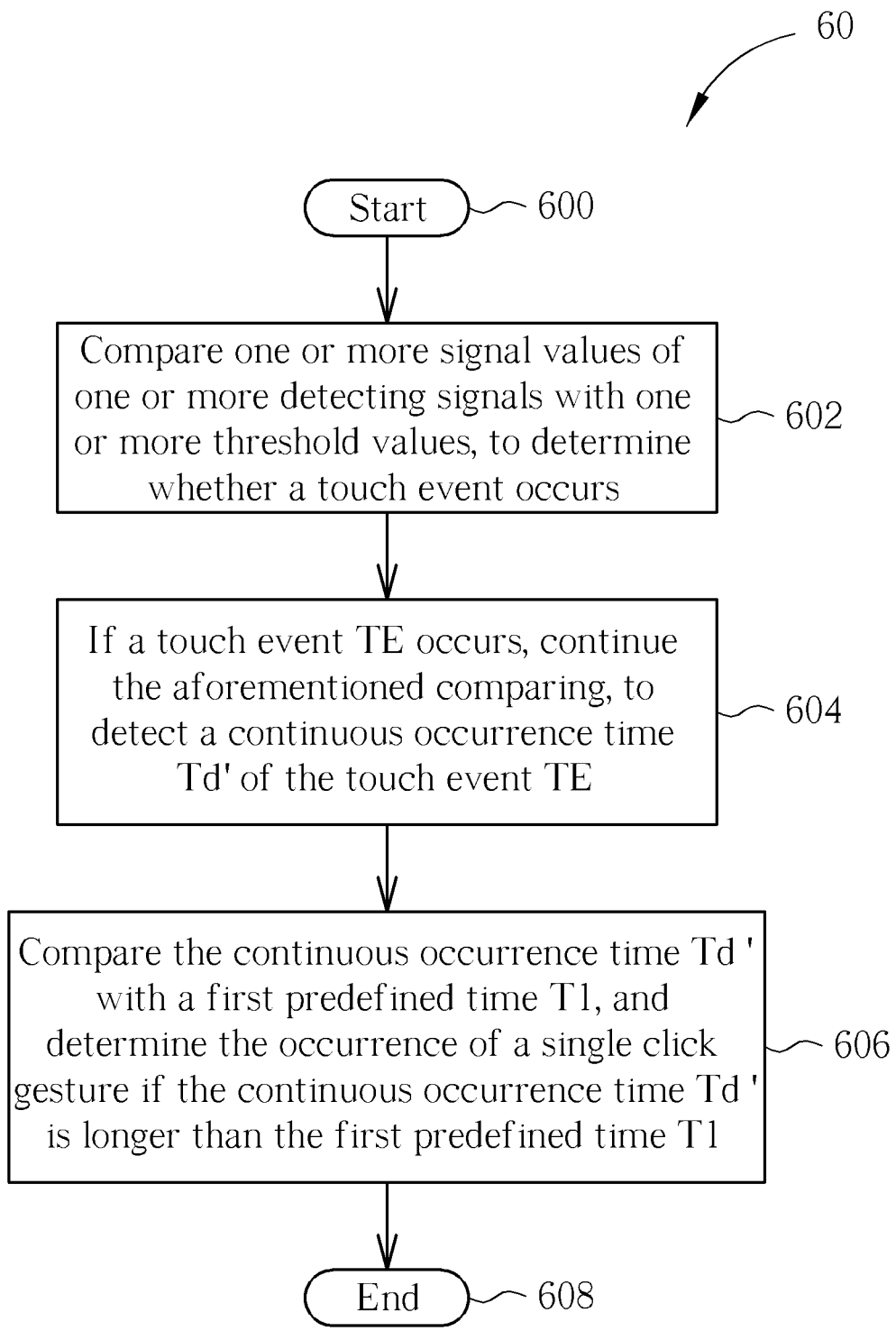
FIG. 6 is a schematic diagram of a single click gesture determination process of a touch control chip according to an embodiment.

The single click gesture determination method of the touch control chip 302 can be summarized into a single click gesture determination process 60 as illustrated by the embodiment of FIG. 6, including the following steps:

Step 600: Start

Step 602: Compare one or more signal values of one or more detecting signals with one or more threshold values, to determine whether a touch event occurs.

Step 604: If a touch event TE occurs, continue the aforementioned comparing, to detect a continuous occurrence time Td' of the touch event TE.

Step 606: Compare the continuous occurrence time Td' with a first predefined time T1, and determine the occurrence of a single click gesture if the continuous occurrence time Td' is longer than the first predefined time T1.

step 608: End wherein the details for each step can be similarly generalized from the operations of components of the touch control chip 302, and are not narrated hereinafter.

Prior art techniques impose distance constraints, which require entering points and leaving points to be the same, and determine single click gestures to occur at the entering point (i.e. the leaving point), thus resulting in a determination process that is not only overcomplicated, but also not flexible enough for various applications. In comparison, the aforementioned embodiments do not require the entering point TI1 and the leaving point TO1 to be the same and the single click gesture may be determined to occur at the leaving point TO1. Accordingly, the embodiments enable a single click gesture to be determined more simply and more flexibly for various applications, and even allow the possibility of multi-finger operations.

Those skilled in the art will readily observe that numerous modifications and alterations of the device and method may be made while retaining the teachings of the invention.

What is claimed is:

1. A click gesture determination method, comprising steps of:
    comparing one or more signal values of one or more detecting signals with one or more threshold values, to determine whether a touch event occurs;
    continuing the above comparing if a touch event occurs, to detect a continuous occurrence time of the touch event;
    comparing the continuous occurrence time with a first predefined time and a second predefined time;
    comparing a first distance between an entering point at a start of the continuous occurrence time and a first leaving point at an end of the continuous occurrence time with a predefined distance; and
    determining the single click gesture occurs if the continuous occurrence time is greater than the first predefined time and shorter than the second predefined time and the first distance is greater than the predefined distance, or otherwise determine the single click gesture does not occur.

2. The click gesture determination method of claim 1, wherein the step of determining the single click gesture occurs comprises determining the single click gesture occurs at a first leaving point at an end of the continuous occurrence time.

3. The click gesture determination method of claim 1, further comprising:
    further determining whether a second touch event concurrently occurs while comparing the one or more signal values of the one or more detecting signals with the one or more threshold values;
    continuing the above comparing if a second touch event concurrently occurs, to detect a concurrent continuous occurrence time of the first touch event and the second touch event; and
    comparing the concurrent continuous occurrence time with the first predefined time and the second predefined time;
    comparing a second distance between an entering point at a start of the concurrent continuous occurrence time and a second leaving point at an end of the concurrent continuous occurrence time with a predefined distance; and
    determining a second single click gesture occurs if the concurrent continuous occurrence time is longer than the first predefined time and shorter than the second predefined time and the second distance is greater than the predefined distance.

4. The click gesture determination method of claim 3, wherein the step of determining the second click gesture occurs comprises determining the second click gesture occurs at the second leaving point at an end of the continuous occurrence time.

5. A click gesture determination method, comprising steps of:
    comparing one or more signal values of one or more detecting signals with one or more threshold values, to determine whether a touch event occurs;
    continuing the above comparing if a touch event occurs, to detect a continuous occurrence time of the touch event;
    comparing the continuous occurrence time with a first predefined time;
    comparing a first distance between an entering point at a start of the continuous occurrence time and a first leaving point at an end of the continuous occurrence time with a predefined distance; and
    determining the single click gesture occurs if the continuous occurrence time is greater than the first predefined time and the first distance is greater than the predefined distance, or otherwise determine the single click gesture does not occur.

6. The click gesture determination method of claim 5, wherein the step of determining the single click gesture occurs comprises determining the single click gesture occurs at the first leaving point at an end of the continuous occurrence time.

7. The click gesture determination method of claim 5, further comprising:
    further determining whether a second touch event concurrently occurs while comparing the one or more signal values of the one or more detecting signals with the one or more threshold values;
    continuing the above comparing if a second touch event concurrently occurs, to detect a concurrent continuous occurrence time of the first touch event and the second touch event; and
    comparing the concurrent continuous occurrence time with the first predefined time;
    comparing a second distance between an entering point at a start of the concurrent continuous occurrence time and a second leaving point at an end of the concurrent continuous occurrence time with a predefined distance; and
    determining a second single click gesture occurs if the concurrent continuous occurrence time is longer than the first predefined time and the second distance is greater than the predefined distance.

8. The click gesture determination method of claim 7, wherein the step of determining the second click gesture occurs comprises determining the second click gesture occurs at the second leaving point at an end of the continuous occurrence time.

9. A click gesture determination method, comprising steps of:
    comparing one or more signal values of one or more detecting signals with one or more threshold values, to determine whether a touch event occurs and a second touch event concurrently occurs;
    continuing the above comparing if a touch event occurs, to detect a continuous occurrence time of the touch event;
    continuing the above comparing if a second touch event concurrently occurs, to detect a concurrent continuous occurrence time of the first touch event and the second touch event;
    comparing the continuous occurrence time with a first predefined time, and determining a single click gesture occurs if the continuous occurrence time is greater than the first predefined time; and
    comparing the concurrent continuous occurrence time with the first predefined time, and determining a second single click gesture occurs if the concurrent continuous occurrence time is longer than the first predefined time.

10. The click gesture determination method of claim 9, wherein the step of determining the single click gesture occurs comprises determining the single click gesture occurs at a first leaving point at an end of the continuous occurrence time.

11. The click gesture determination method of claim 7, wherein the step of determining the second click gesture occurs comprises determining the second click gesture occurs at a second leaving point at an end of the continuous occurrence time.

12. A touch control chip for a touch control system, comprising:
    a detection unit, for comparing one or more signal values of one or more detecting signals with one or more threshold values, to determine whether a touch event occurs, and continuing the above comparing if a touch event occurs, to detect a continuous occurrence time of the touch event; and a determining unit, for comparing the continuous occurrence time with a first predefined time and a second predefined time, comparing a first distance between an entering point at a start of the continuous occurrence time and a first leaving point at an end of the continuous occurrence time with a predefined distance, and determining the single click gesture occurs if the continuous occurrence time is greater than the first predefined time and shorter than the second predefined time and the first distance is greater than the predefined distance, or otherwise determine the single click gesture does not occur.

13. The touch control chip of claim 12, wherein the determining unit determines the single click gesture occurs at a first leaving point at an end of the continuous occurrence time.

14. The touch control chip of claim 12, wherein the detection unit further determines whether a second touch event concurrently occurs while comparing the one or more signal values of the one or more detecting signals with the one or more threshold values, and continues the above comparing if a second touch event concurrently occurs, to detect a concurrent continuous occurrence time of the first touch event and the second touch event; and the determining unit further compares the concurrent continuous occurrence time with the first predefined time and the second predefined time, compares a second distance between an entering point at a start of the concurrent continuous occurrence time and a second leaving point at an end of the concurrent continuous occurrence time with a predefined distance, and determines a second single click gesture occurs if the concurrent continuous occurrence time is longer than the first predefined time and shorter than the second predefined time and the second distance is greater than the predefined distance.

15. The touch control chip of claim 3, wherein the determining unit determines the second click gesture occurs comprises determining the second click gesture occurs at the second leaving point at an end of the continuous occurrence time.

16. A touch control chip for a touch control system, comprising:

a detection unit, for comparing one or more signal values of one or more detecting signals with one or more threshold values, to determine whether a touch event occurs, and continuing the above comparing if a touch event occurs, to detect a continuous occurrence time of the touch event; and a determining unit, for comparing the continuous occurrence time with a first predefined time, comparing a first distance between an entering point at a start of the continuous occurrence time and a first leaving point at an end of the continuous occurrence time with a predefined distance, and determining the single click gesture occurs if the continuous occurrence time is greater than the first predefined time and the first distance is greater than the predefined distance, or otherwise determine the single click gesture does not occur.

17. The touch control chip of claim 16, wherein the determining unit determines the single click gesture occurs comprises determining the single click gesture occurs at the first leaving point at an end of the continuous occurrence time.

18. The touch control chip of claim 16, wherein the detection unit further determines whether a second touch event concurrently occurs while comparing the one or more signal values of the one or more detecting signals with the one or more threshold values, and continues the above comparing if a second touch event concurrently occurs, to detect a concurrent continuous occurrence time of the first touch event and the second touch event; and the determining unit further compares the concurrent continuous occurrence time with the first predefined time, compares a second distance between an entering point at a start of the concurrent continuous occurrence time and a second leaving point at an end of the concurrent continuous occurrence time with a predefined distance, and determines a second single click gesture occurs if the concurrent continuous occurrence time is longer than the first predefined time and the second distance is greater than the predefined distance.

19. The touch control chip of claim 18, wherein the determining unit determines the second click gesture occurs comprises determining the second click gesture occurs at the second leaving point at an end of the continuous occurrence time.

20. A touch control chip for a touch control system, comprising:

a detection unit, for comparing one or more signal values of one or more detecting signals with one or more threshold values, to determine whether a touch event occurs and a second touch event concurrently occurs, continuing the above comparing if a touch event occurs, to detect a continuous occurrence time of the touch event, and continuing the above comparing if a second touch event concurrently occurs, to detect a concurrent continuous occurrence time of the first touch event and the second touch event; and a determining unit, for comparing the continuous occurrence time with a first predefined time, and determining a single click gesture occurs if the continuous occurrence time is greater than the first predefined time, and comparing the concurrent continuous occurrence time with the first predefined time, and determining a second single click gesture occurs if the concurrent continuous occurrence time is longer than the first predefined time.

21. The touch control chip of claim 20, wherein the determining unit determines the single click gesture occurs comprises determining the single click gesture occurs at a first leaving point at an end of the continuous occurrence time.

22. The touch control chip of claim 20, wherein the determining unit determines the second click gesture occurs comprises determining the second click gesture occurs at a second leaving point at an end of the continuous occurrence time.

* * * * *